(12) United States Patent
Merz et al.

(10) Patent No.: US 7,077,492 B2
(45) Date of Patent: Jul. 18, 2006

(54) METHOD AND DEVICE FOR OPTICAL SENSOR COMPENSATION, AND APPARATUS INCORPORATING THE SAME

(75) Inventors: Eric A. Merz, Palmyra, NY (US); Yoshihiko Fujimura, Fujisawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 280 days.

(21) Appl. No.: 10/721,332

(22) Filed: Nov. 26, 2003

(65) Prior Publication Data
US 2005/0110984 A1  May 26, 2005

(51) Int. Cl.
*B41J 29/393* (2006.01)
(52) U.S. Cl. ........................................ 347/19
(58) Field of Classification Search ............ None
See application file for complete search history.

(56) References Cited

U.S. PATENT DOCUMENTS

| | | | | |
|---|---|---|---|---|
| 4,150,902 A | * | 4/1979 | Brescia | 400/17 |
| 4,262,366 A | * | 4/1981 | Eumurian | 398/16 |
| 4,473,830 A | * | 9/1984 | Piatt et al. | 347/75 |
| 5,283,424 A | | 2/1994 | Acquaviva et al. | |
| 5,950,040 A | * | 9/1999 | Mestha et al. | 399/46 |
| 6,264,298 B1 | | 7/2001 | Mantell | |
| 6,290,351 B1 | | 9/2001 | Merz | |
| 6,498,333 B1 | * | 12/2002 | Christensen | 250/214 AG |
| 6,678,224 B1 | * | 1/2004 | Yamashita et al. | 369/47.25 |
| 6,726,313 B1 | * | 4/2004 | Oda et al. | 347/85 |

* cited by examiner

*Primary Examiner*—Michael P. Stafira
(74) *Attorney, Agent, or Firm*—Oliff & Berridge, PLC

(57) ABSTRACT

An optical sensor has a sensor compensation to compensate for sensor degradation due to airborne contaminations in the operating environment. For example, in a thermal ink jet printing environment, the thermal ink jet operation produces misting or splashing of the thermal ink jet droplets, causing a gradual degradation of the sensor sensitivity due to a surface accumulation of the ink jet droplets. The optical sensor device includes an optical emitter emitting an optical signal according to an emitter input, an optical detector disposed to detect the optical signal and output a detector output having an output level according to the detected optical signal, a variable attenuator having an adjustable attenuation setting, and a controller adjusting the attenuation setting of the variable attenuator. During an adjustment operation, the controller determines the attenuation setting at which the output level of the detector output exceeds a predetermined value, and accordingly sets the variable attenuator to operate the detector output at an output level exceeding the predetermined value by a margin. Compensations for the optical emitter and the optical detector are disclosed, including the use of a variable pulse-width modulated signal.

18 Claims, 6 Drawing Sheets

METHOD AND DEVICE FOR OPTICAL SENSOR COMPENSATION, AND APPARATUS INCORPORATING THE SAME

BACKGROUND OF THE INVENTION

1. Field of Invention

This invention relates generally to a method and device for optical sensor compensation to automatically adjust for sensor degradation, and an apparatus incorporating the same.

2. Description of Related Art

Fluid ejector systems, such as drop-on-demand liquid ink printers, have at least one fluid ejector from which droplets of fluid are ejected towards a receiving sheet. Scanning inkjet printers are equipped with fluid ejection heads containing fluid ink. The ink is applied to a sheet in an arrangement based on print data received from a computer, scanner or similar device. To control the delivery of the fluid to the sheet, fluid ejection heads are moved across the sheet to provide the fluid to the sheet, which is ejected as drops. These drops correspond to a liquid volume designated as pixels. Each pixel is related to a quantity needed to darken or cover a particular unit area.

An exemplary fluid ejector system is a thermal ink jet printer. FIG. 1 illustrates a partial schematic perspective view of an ink jet printhead cartridge 26 mounted on a carriage 23 supported by carriage rails 24. The printhead cartridge 26 in housing 25 contains ink for supply to a thermal ink jet printhead 20, which selectively expels droplets of ink under control of electrical signals received from a controller 27.

The carriage 23 is moved back and forth in the scanning directions 28 by a belt 29 attached thereto. The belt 29 is moved by a first rotatable pulley 17 and a second rotatable pulley 18, one of which is driven by a motor (unshown).

To control the movement and/or position of the carriage 23 along the carriage rails 24, the printer includes an encoder having an encoder strip 21 which includes a series of fiducial marks 19 in a pattern. The pattern is sensed by a sensor 22, such as a photodiode/light source, which may be attached to the printhead carriage 23. The sensor 22 transmits electrical signals representing the sensed fiducial marks 19 to the printer controller 27 to thereby measure actual printhead position as it reciprocates along carriage rails 24. Encoder 21 may be formed of a thin film of transparent plastic with opaque scaled lines to provide linear fence encoding. The encoder runs parallel with carriage movement along carriage rod 24. The encoder 21 may be provided under the encoder sensor 22 for displacement detection with a movement of the scanning carriage. Alternatively, rather than having sensor 22 contain both a light source and photodetector on the same side, one of them may be provided on the opposite side of encoder film 21 to sense light transmitted through transparent portions of the film.

As another example, a printer may utilize a rotary encoder having a code disc with a series of radially arranged fiducial marks 19 in a pattern. The pattern is sensed by a sensor, as described above for the linear encoder. The sensor transmits electrical signals representing the sensed fiducial marks 19 to the printer controller. Thus, a rotary encoder and sensor as described may also be used by a printer for optical measurements of lengths and angles.

Often times one or more other optical sensors are provided in near proximity to the printhead 20. FIG. 2 shows such an arrangement in which ink drops 14 are ejected from an ink jet nozzle 11 of printhead 20. The two optical sensors 12 and 13 are shown located in the same scanning carriage 23 with the thermal ink jet printhead 20. These sensors 12 and 13 typically are disposed toward the imaging platen 15 where a sheet of paper is typically positioned. One of the sensors 12 senses the page position of the paper in order to locate the image on the paper. Another of the sensors 13 typically senses the location of printing on the paper in order to align the color and black printheads to each other.

In FIG. 3, a light emitting device (LED) 5 forming part of an optical sensor 30 is shown with a pull-up resistor 31. A phototransistor 6 is shown as a common-emitter amplifier to detect the emitted light from LED 5. The output Vout is created by connecting a resistor 33 between the voltage supply Vcc and the collector terminal of the phototransistor 6. Depending on the actual configuration of the optical sensor 30, the phototransistor 6 may detect a reflected light or a transmitted light. When optical sensor 30 is used as a page position sensor or a color alignment sensor, such as sensors 12 and 13, light reflected from a paper is detected by the optical detector (phototransistor) 6. For encoders having a combination of sensor 22 and encoder 21, such as a linear fence encoder or a rotary encoder, light may be reflected from the encoder as shown in FIG. 1, or alternatively, light transmitted from the optical emitter 5 through the encoder may be detected by the optical detector 6.

A recurring problem in ink jet printing or xerographic copying is the contamination of optical sensors, particularly those in the paper path. For example, Thermal Inkjet (TIJ) printing ejects small drops of ink onto paper. Referring to FIG. 2, during the ejection of the droplets 14 from the printhead 20, when the droplets spray from the printhead 20, tiny droplets called satellites may form a "misting." Also, after the droplet 14 hits the target medium, it can sometimes "splash" from the surface, creating tiny airborne droplets. These droplets and satellites are very small, on the order of a picoliter or less. They become airborne in the high velocity air currents from the printhead 20 traversing during its printing swath.

Particularly, during the life of the ink jet printer, these airborne particles together may become contaminants that coat the optical elements over time, causing eventual malfunction or failure, requiring maintenance or replacement. Other contaminants, such as dust, also accumulate over time within the printer and coat the optical elements.

SUMMARY OF THE INVENTION

In order to lower cost and improve the life and performance of a printing or copying apparatus, a self compensating optical sensor device, method, and apparatus is desirable that compensates for degradation due to contamination, such as from dust, fluid misting or splashing. This extends the life of the apparatus, improves the device performance over the life of the apparatus, and extends the life of serviceability between routine maintenance. It is also desirable to enable an alert identification when sensor compensation is insufficient to achieve desired sensor performance.

Exemplary methods, systems and structures of the invention adjust for sensor degradation due to such contaminations. The system may also compensate for other variations in these targets that can cause errors. For example, by actively sensing a target and compensating the optical sensor, measurement errors due to the sensed ink color or the color of the paper may be avoided by adjusting to these variations.

Various exemplary methods, systems and structures of the invention extend the useful life of a printing or copying apparatus using a fluid ejection system with one or more optical sensors.

Various exemplary embodiments of the invention separately provide an optical sensor with compensation of the sensor emitter input based on the detector output.

Various exemplary embodiments of the invention separately provide an optical sensor with compensation of the optical detector based on the detector output.

Various exemplary embodiments of the invention separately provide a method for compensating an optical sensor based on the detector output.

Various aspects of the invention are particularly suited for use in printing engines, such as ink jet printers and xerographic copiers which suffer from optical sensor degradation from contaminants, such as ink or toner misting or splashing, dust or the like.

In various exemplary embodiments, an optical sensor device includes an optical emitter emitting an optical signal according to an emitter input, an optical detector disposed to detect the optical signal and output a detector output having an output level according to the detected optical signal, a variable attenuator having an adjustable attenuation setting, and a controller adjusting the attenuation setting of the variable attenuator. More particularly, during an adjustment operation, the controller determines the attenuation setting at which the output level of the detector output exceeds a predetermined value, and accordingly sets the variable attenuator to operate the detector output at an output level better than the predetermined value by a margin. Both the compensation of the optical emitter and/or the compensation of the optical detector are separately disclosed as methods, devices and apparatus incorporating the same.

These and other features and advantages of this invention are described in, or are apparent from, the following detailed description of various exemplary embodiments of the devices, methods and apparatuses according to this invention.

BRIEF DESCRIPTION OF THE DRAWINGS

Various exemplary embodiments of the devices, systems and methods of this invention will be described in detail with reference to the following figures, wherein.

DETAILED DESCRIPTION OF EXEMPLARY EMBODIMENTS

The following detailed description of various exemplary embodiments of an optical sensor method, device for optical sensor compensation due to contamination, and an apparatus incorporating the same may be usable with various devices incorporating one or more optical sensors in an environment subjected to contamination over time. In exemplary embodiments, this may be within fluid ejection systems or other technologies that store and consume fluids. One specific type of fluid ejection system, e.g., an inkjet printer, forms an exemplary method and device according to this invention, for sake of clarity and familiarity. However, it should be appreciated that the principles of this invention, as outlined and/or discussed below, can be equally applied to any known or later-developed fluid ejection systems, for example a xerographic reproduction apparatus, beyond the ink jet printer specifically discussed herein.

Several exemplary methods and devices for optical sensor compensation due to contamination, such as ink jet misting or splashing are disclosed. However, the several exemplary methods and devices for optical sensor compensation may also compensate for other variations in the sensed target, e.g., the sensed ink color or the sensed color of medium. The several exemplary methods and devices range from compensating the optical emitter emitting an optical signal to compensating the optical detector disposed to detect the optical signal by various means and methods. Those exemplary methods and devices are incorporated in several exemplary printers, ink jet printers and xerographic reproduction apparatuses.

Figure 4:
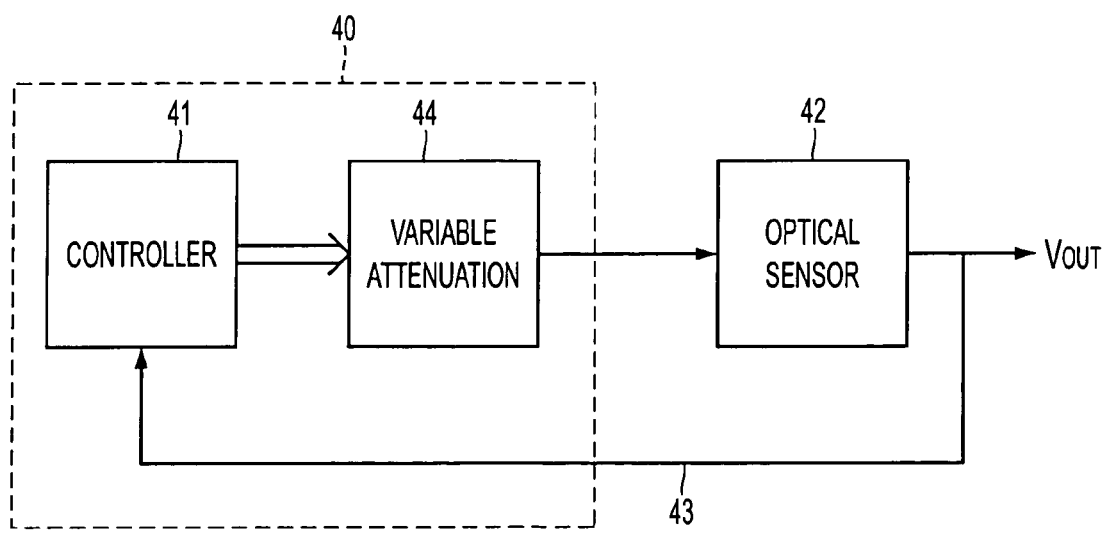
FIG. 4 is a conceptual block diagram of a controller controlling an optical sensor device in accordance with aspects of this invention.

FIG. 4 shows an overview block diagram of an exemplary optical sensor device 42 provided with a compensation circuit 40. The optical sensor device 42 is shown as being controlled by the controller 41 to produce a detector output 43 having a predetermined output level. The detector output 43 is fed back to the controller 41, which uses the detector output 43 to control the output level of the sensor device 42 using attenuation circuit 44 based on a predetermined value. The control interface relating to the control of circuit 44 may encompass any of the state-of-the-art methods and arrangements, particularly as they relate to digital control of variable attenuation.

Figure 5:
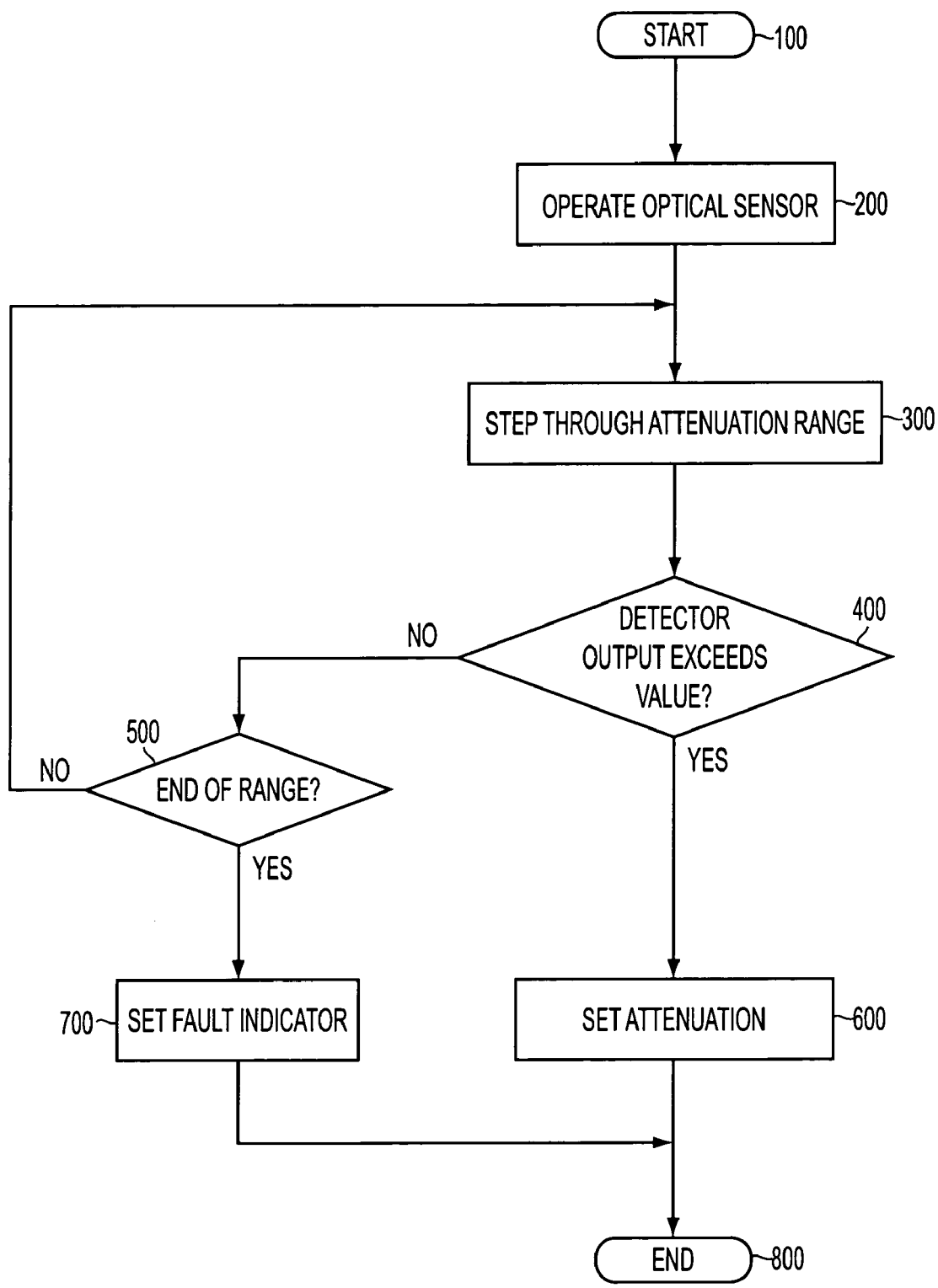
FIG. 5 is a flowchart that outlines one method for optical sensor compensation due to contamination in accordance with various exemplary embodiments of this invention.

FIG. 5 is a flowchart outlining one exemplary method for optical sensor compensation due to degradation from misting or splashing, other contamination or sensed color in accordance with various ones of the exemplary embodiments of this invention. As shown in FIG. 5, beginning in step 100, operation continues to step 200, where a sheet of recording medium is fed into position and an optical sensor of a fluid ejection system is adjusted. For example, an optical sensor is positioned and activated to sense the edges of the recording medium, by the optical emitter being disposed to emit an optical signal towards the medium, and the optical detector being disposed to detect the optical signal either reflected from or transmitted through the medium and outputting a detector output having an output level according to the detected optical signal.

Next, in step 300, an attenuation setting of a variable attenuator is stepped through its range of attenuation values by discrete step values to vary the output level of the detector output.

Next, in step 400, for each attenuation setting of step 300, the output metric of the detector output is compared with a predetermined value, the output metric being a voltage level, a voltage drop, or a detection trigger level. If the output metric of the detector output does not exceed a predetermined value, then the process is passed to step 500. Otherwise, operation jumps to step 600.

At step 500, if the attenuation setting of the variable attenuator has not reached an end of the range of attenuation values, the attenuation setting is stepped through the next setting value in the range of attenuation. Otherwise, the operation jumps to step 700 in which an alert identification is enabled to indicate that the sensor compensation is insufficient to achieve desired sensor performance.

At step 600, the attenuation of the variable attenuator is set to reset the output metric of the detector output at a level exceeding the predetermined value by a margin to compensate for sensor degradation due to, for example, contamination on the sensor from fluid misting or splashing, or to compensate for sensed color.

The method for optical sensor compensation for misting or splashing, other contamination or sensed color is completed at step 700 with the setting of the attenuation.

It should be appreciated that, in the exemplary illustrative method for optical sensor compensation, the sheet of medium may be a paper, either white or color; a transparency; any other print or copy medium in sheets; a transparent strip encoded with linear fence encoding; or a rotary disc component of a rotary encoder.

It should be also appreciated that, in the method for optical sensor compensation, the optical detection may be of a reflected light or a transmitted light. For the exemplary embodiment of the optical sensor device configured as a page position sensor, a color alignment sensor or the like, the detection may be of a light reflected from a sheet of medium. For the exemplary embodiment of the sensor device for either a linear fence encoder or a rotary encoder, light transmitted from the optical emitter and either reflected from or transmitted through the visually encoded encoder film may be detected by the optical detector 6.

It should be also appreciated that, the method for optical sensor compensation may be performed during a page position sensing operation for a page position sensor; a color alignment operation for a color alignment sensor; or during a power startup or a job initiation for either a linear fence encoder or a rotary encoder and sensor. The method for optical sensor compensation is equally applicable to individual compensations of the emitter input for the optical emitter; the common-emitter amplifier circuitry, the common-collector amplifier circuitry or the base circuitry of the optical detector; or any combination of the above circuitry.

Figure 6:
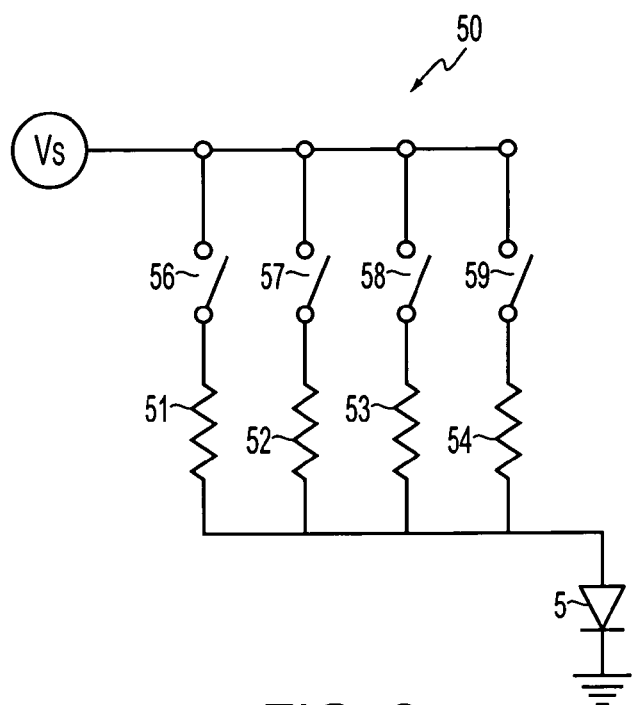
FIG. 6 is an exemplary ladder network of resistors shown as a pull-up resistor for an optical emitter in accordance with various exemplary embodiments of the invention.

FIG. 6 shows an exemplary schematic diagram of a sensor attenuation circuit 44 formed by a simple resistor ladder network 50 of resistors 51–54. The individual resistors 51–54 of ladder network 50 are switch connected by switches 56–59 to a voltage source Vs so as to be able to step through a range of attenuation settings by discrete step values.

The ladder network 50 of FIG. 6 illustrates an exemplary variable attenuator compensation circuit having an adjustable attenuation setting and being electrically connected to a voltage source Vs and an optical emitter 5 to adjustably vary the emitter input. For example, assigning the values of 5V for Vs and 1K Ω, 500 Ω, 250Ω and 125Ω to resistors 51–54, allows the simple resistor ladder network 50 to deliver controllable currents to the optical emitter 5 having a range of 5–75 mA in increments of 5 mA, approximately, not accounting for the typical 0.7V voltage drop across the optical emitter. The ladder network 50 may be cycled through a range of values in discrete steps as controlled by the controller 41 to determine an appropriate attenuation setting to compensate the optical sensor device for continued operation even when subjected to degradation from contamination.

Figure 7:
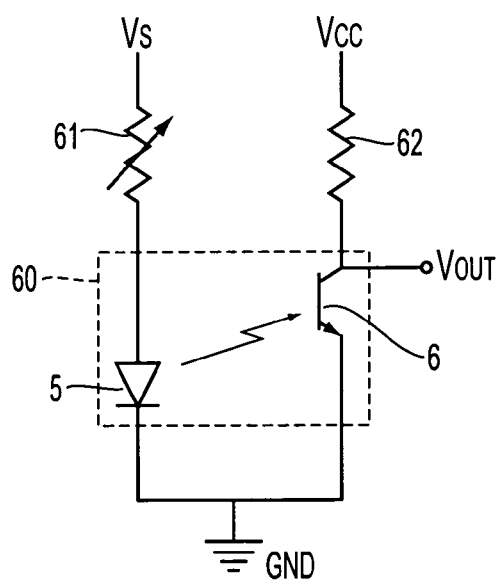
FIG. 7 is an optical sensor device with sensor compensation in accordance with various exemplary embodiments of the invention.

FIG. 7 shows one exemplary embodiment of an optical sensor device 60. A variable attenuator 61 connects between a voltage source Vs and optical emitter 5 and forms a sensor attenuation circuit. The optical emitter 5 is connected to the ground GND at the other end. The optical emitter 5 circuit can be tuned electronically by changing resistor values to change the emitter input, thereby changing the sensitivity of the sensor.

The optical emitter 5 is compensated for mist, other contamination or sensed color by the controller 41 controlling the variable attenuator 61. Controller 41 adjusts the attenuation setting of the variable attenuator 61 during an adjustment operation to adjustably vary the emitter input, determines the attenuation setting at which the output voltage drop of the detector output Vout exceeds a predetermined value, and accordingly sets the variable attenuator 61 at an attenuation setting lower than the determined attenuation setting to operate the detector with the output Vout voltage drop exceeding the predetermined value by a margin. The optical emitter 5 emits an optical signal according to the emitter input as compensated by the variable attenuator 61.

Specifically, the controller 41 may cycle the attenuation setting of the variable attenuator 61 from the lowest emitter current setting to the highest emitter current setting while comparing the detector output Vout during an adjustment operation. When the detector output Vout voltage drop exceeds the predetermined value, the attenuation setting of the variable attenuator 61 is set at an attenuation setting lower than the determined attenuation setting to operate the detector with the output Vout voltage drop exceeding the predetermined value by a margin. The margin may relate to setting the operating emitter current to some multiple of the sensed predetermined current.

FIG. 7 also shows an exemplary common-emitter amplifier circuitry for the optical detector 6. A resistor 62 is connected between another voltage source Vcc and the collector terminal of the optical detector 6, the emitter terminal of the optical detector 6 being connected to the ground GND. The detector output Vout is shown at the collector terminal. The common-emitter amplifier generates an output which transitions from a high state to a low state when light is detected by the optical detector 5.

Depending on the configuration, the optical detector 6 may detect a reflected light or a transmitted light. For a page position sensor, a color alignment sensor or the like, emitted light from the optical emitter and reflected from a medium, such as a sheet of paper, may be detected by the optical detector 6. For either a linear fence encoder or a rotary encoder, light transmitted from the optical emitter and either reflected from or transmitted through the visually encoded encoder film may be detected by the optical detector 6. The encoder film may or may not be transparent.

Alternatively, pulse-width modulation (PWM) may be used to provide an optical sensor with compensation of the sensor emitter input based on the detector output to drive the optical emitter. Pulse-width modulation may be used to increase the effective range of adjustment of brightness of the optical emitter by several orders of magnitude without sacrificing the life of the device.

Figure 1:
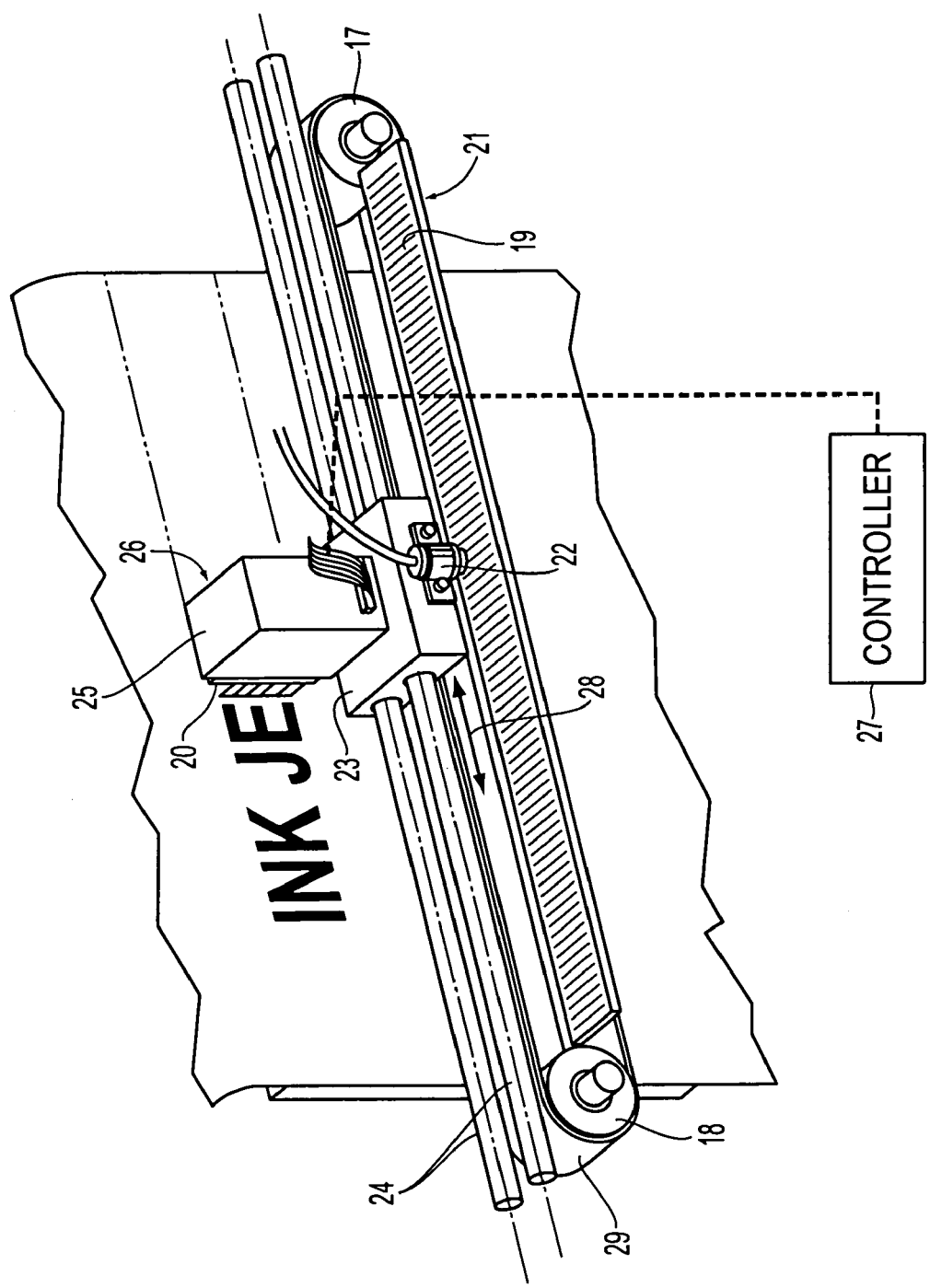
FIG. 1 illustrates an exemplary ink jet printhead ejecting ink towards a medium, such as paper, and an exemplary placement of sensors subject to contamination according to the invention.
Figure 2:
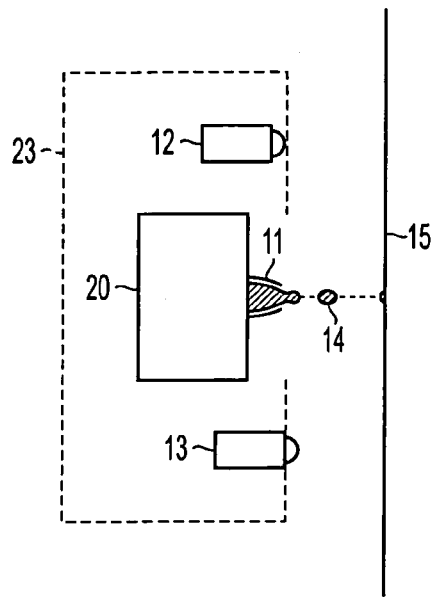
FIG. 2 shows a view of additional optical sensor devices associated with the printhead of FIG. 1.
Figure 3:
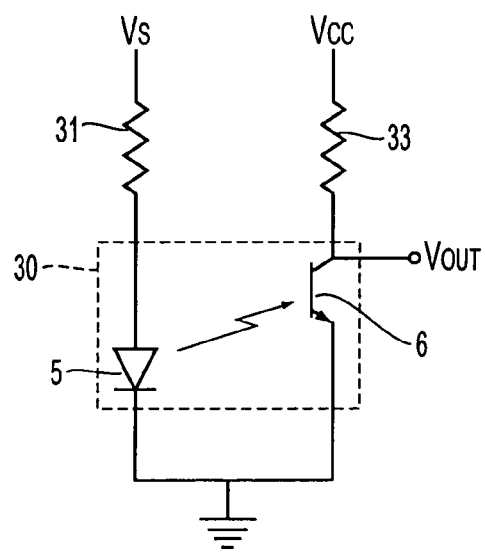
FIG. 3 shows a schematic diagram of an exemplary optical sensor device.

As an alternative exemplary embodiment of the invention which provides an optical sensor with compensation of the sensor emitter input based on the detector output to drive the optical emitter, a PWM signal input Vs may variably drive the sensor emitter input of an optical sensor 30 shown in FIG. 3 based on the detector output Vout. However, it should be appreciated that, in various alternative exemplary embodiments, any of the optical sensor devices shown in FIGS. 3 and 7–10 may be used with a PWM signal input Vs to variably drive the sensor emitter input based on the detector output.

Figure 11:
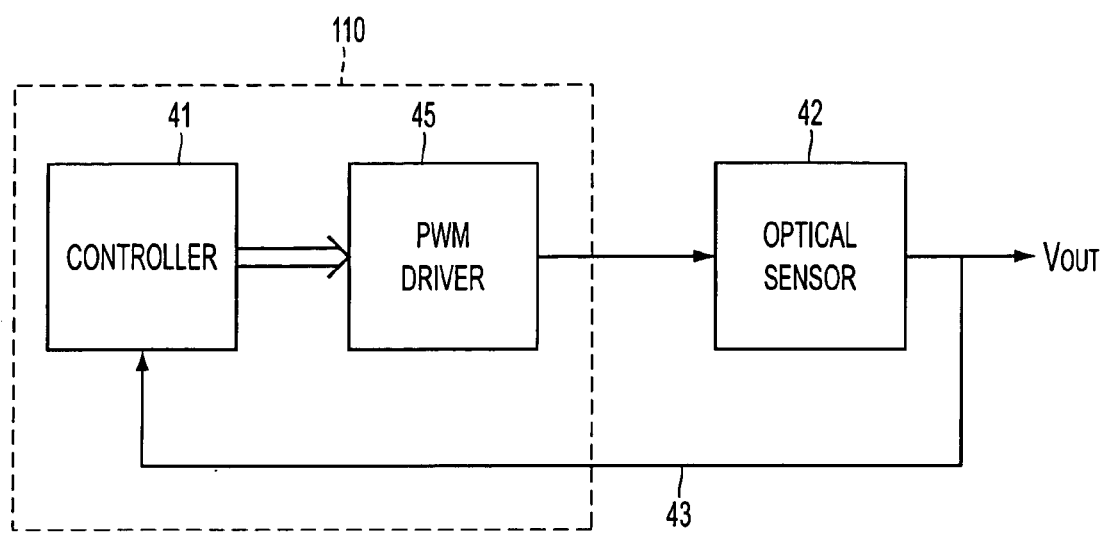
FIG. 11 is a conceptual block diagram of a controller controlling a pulse-width modulated signal driver driving an optical sensor device in accordance with alternative aspects of this invention.

FIG. 11 shows an overview block diagram of an alternative exemplary optical sensor device 42 provided with a PWM-based compensation circuit 110. The optical sensor device 42 is shown as being controlled by the controller 41 to produce a detector output 43 having a predetermined output level. The detector output 43 is fed back to the controller 41, which uses the detector output 43 to control the PWM duty cycle driving the output level of the sensor device 42 using a PWM driver 45 based on a predetermined value. The control interface relating to the control of circuit may encompass any of the state-of-the-art methods and arrangements, particularly as they relate to control of a PWM driver 45.

An exemplary method for optical sensor compensation using the PWM-controlled signal input Vs parallels the method shown in FIG. 5. For example, references to the attenuation and attenuation range in steps 300–700 now refer to the PWM duty cycle and PWM duty cycle range, respectively. For example, in step 300 of the PWM control method, a duty cycle setting of a PWM driver is stepped through its range of duty cycle values by discrete step values to vary the output level of the detector output.

It should be appreciated that, in various exemplary embodiments, the optical emitter may be a light emitting diode. In general, while the term "light" is used herein, it should be understood that this term is not limited to visible light wavelengths, or even to wavelengths indicated above. Rather, "light" is intended to encompass electromagnetic radiation of any appropriate wavelength, so long as the material is at least partially transmissive at that wavelength and Snell's law holds.

It should also be appreciated that, in various exemplary embodiments, the voltage source Vs for all exemplary embodiments, as shown in FIGS. 3–10, may be a switched signal, a constant voltage source or a pulse-width modulated drive signal.

Figure 8:
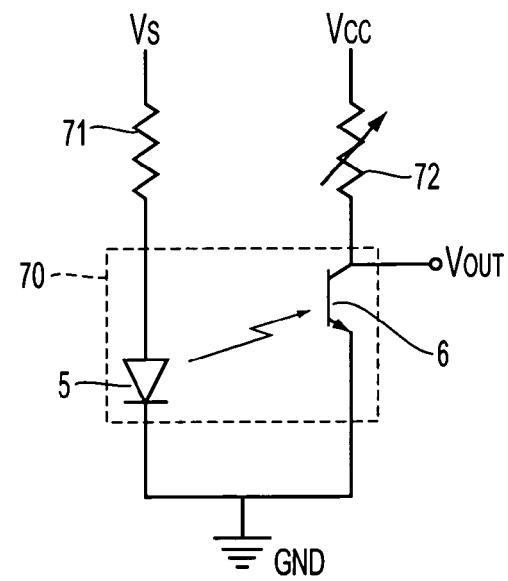
FIG. 8 is an optical sensor device with a variable common-emitter amplifier in accordance with various exemplary embodiments of the invention.

FIG. 8 shows another exemplary embodiment of an optical sensor device 70 having a variable common-emitter amplifier. In the variable common-emitter amplifier, a variable attenuator 72 is connected between a voltage source Vcc and the collector terminal of an optical detector 6, the emitter terminal of the optical detector 6 being connected to the ground GND. The detector output Vout is shown at the collector terminal. The variable common-emitter amplifier generates a detector output Vout which transitions from a high state to a low state when light is detected by the optical detector 6. The variable common-emitter amplifier can be tuned electronically by changing resistor values of the variable attenuator, thereby changing the sensitivity of the sensor. Depending on the actual configuration, the optical detector 6 may detect a reflected light or a transmitted light.

The optical detector 6 is compensated for mist, other contamination or sensed color by the controller 41 controlling the variable attenuator 72. Controller 41 adjusts the attenuation setting of the variable attenuator 72 during an adjustment operation, determines the attenuation setting at which the voltage drop of the detector output Vout exceeds a predetermined value, and accordingly sets the variable attenuator 72 at an attenuation setting to operate the detector with the output Vout voltage drop exceeding the predetermined value by a margin. The optical detector 6 detects an optical signal as compensated by the variable attenuator 72.

Specifically, the controller 41 may cycle the attenuation setting of the variable attenuator 72 through its range of settings while comparing the detector output Vout during an adjustment operation. When the detector output Vout voltage drop exceeds the predetermined value, the attenuation setting of the variable attenuator 72 is set at an attenuation setting to operate the detector output Vout with the voltage drop exceeding the predetermined value by a margin.

FIG. 8 also shows an optical emitter to emit an optical signal. A resistor 71 connects between a voltage source Vs and optical emitter 5. The optical emitter 5 is connected to the ground GND at the other end. The optical emitter 5 emits an optical signal according to the voltage source Vs during an adjustment operation. The voltage source Vs may be a switched signal, a constant voltage source or a pulse-width modulated drive signal.

Figure 9:
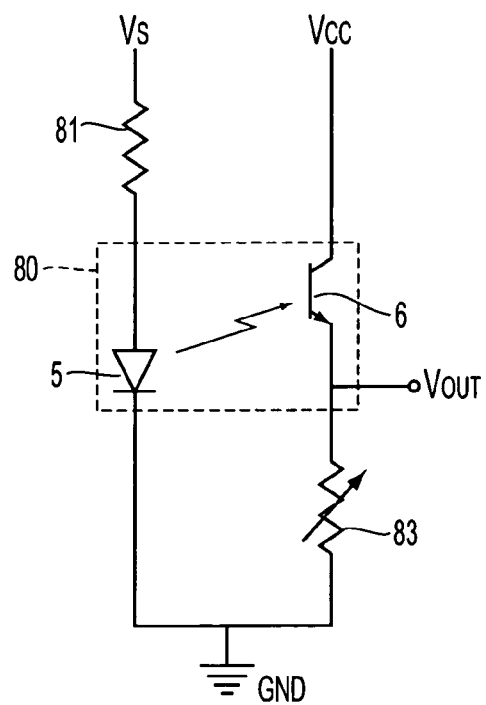
FIG. 9 is an optical sensor device with a variable common-collector amplifier in accordance with various exemplary embodiments of the invention.

FIG. 9 shows another exemplary embodiment of an optical sensor device 80 having a variable common-collector amplifier. In the variable common-collector amplifier, a variable attenuator 83 is connected between the emitter terminal of an optical detector 6 and the ground GND, the collector terminal of the optical detector 6 being connected to a voltage source Vcc. The detector output Vout is shown at the emitter terminal of the optical detector 6. The variable common-collector amplifier generates a detector output Vout which transitions from a low state to a high state when light is detected by the optical detector 6. The variable common-collector amplifier can be tuned electronically by changing resistor values of the variable attenuator, thereby changing the sensitivity of the sensor. Depending on the actual configuration, the optical detector 6 may detect a reflected light or a transmitted light.

The optical detector 6 is compensated for mist, other contamination or sensed color by the controller 41 controlling the variable attenuator 83. Controller 41 adjusts the attenuation setting of the variable attenuator 83 during an adjustment operation, determines the attenuation setting at which the output level of the detector output Vout meets a predetermined value, and accordingly sets the variable attenuator 83 at an attenuation setting to operate the detector output Vout at an output level better than the predetermined value by a margin. The optical detector 6 detects an optical signal as compensated by the variable attenuator 83.

Specifically, the controller 41 may cycle the attenuation setting of the variable attenuator 83 through its range of settings while comparing the detector output Vout during an adjustment operation. When the detector output Vout voltage meets the predetermined value, the attenuation setting of the variable attenuator 83 is set at an attenuation setting to operate the detector output Vout at an output level better than the predetermined value by a margin.

FIG. 9 also shows an optical emitter to emit an optical signal. A resistor 81 connects between a voltage source Vs and an optical emitter 5. The optical emitter 5 is connected to the ground GND at the other end. The optical emitter 5 emits an optical signal according to the voltage source Vs during an adjustment operation. The voltage source Vs may be a switched signal, a constant voltage source or a pulse-width modulated drive signal.

Figure 10:
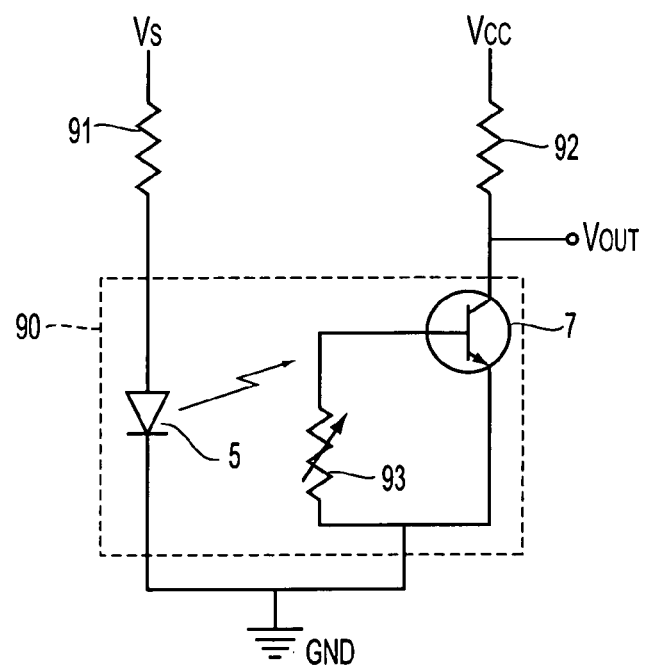
FIG. 10 is an optical sensor device with an optical detector having a variable base connection in accordance with various exemplary embodiments of the invention.

FIG. 10 shows an exemplary embodiment of an optical sensor device 90 with an optical emitter having a variable base circuitry. For this optical emitter 7, a variable attenuator 33 is connected between the base terminal of the optical detector 7 and the emitter terminal of the optical detector, the emitter terminal of the optical detector being connected to the ground GND and the collector terminal of the optical detector 7 being connected to a voltage source Vcc. The detector output Vout is shown at the collector terminal of the optical detector 7. The variable attenuator 93 prevents low levels of light from triggering the optical detector 7. The optical detector can be tuned electronically by changing resistor values of the variable attenuator 93, thereby changing the sensitivity of the sensor. Depending on the actual configuration, the optical detector 7 may detect a reflected light or a transmitted light.

The optical detector 7 is compensated for mist, other contamination or sensed color by the controller 41 controlling the variable attenuator 93. Controller 41 adjusts the attenuation setting of the variable attenuator 93 during an adjustment operation, determines the attenuation setting at which the detector output Vout trigger level meets the predetermined value, and accordingly sets the variable attenuator 93 at an attenuation setting to operate the detector output Vout having a trigger level better than the predetermined value by a margin. The optical detector 7 detects an optical signal as compensated by the variable attenuator 93.

Specifically, the controller 41 may cycle the attenuation setting of the variable attenuator 93 through its range of settings while comparing the detector output Vout during an adjustment operation. When the detector output Vout trigger level meets the predetermined value, the attenuation setting of the variable attenuator 93 is set at an attenuation setting to operate the detector output Vout at a trigger level better than the predetermined value by a margin.

FIG. 10 also shows an optical emitter to emit an optical signal. A resistor 91 connects between a voltage source Vs and an optical emitter 5. The optical emitter 5 is connected to the ground GND at the other end. The optical emitter 5 emits an optical signal according to the voltage source Vs during an adjustment operation. The voltage source Vs may be a switched signal, a constant voltage source or a pulse-width modulated drive signal.

It should be appreciated that, in various exemplary embodiments, the variable attenuators 61, 72, 83 and 93 may encompass any of the broadly available state-of-the-art technologies implementing a variable attenuator, in addition to the ladder network 50. Such variable attenuator 61, 72, 83 and 93 may likewise be controlled by the control input 44 of the controller 41 (FIG. 4). As for the ladder network 50, the variable attenuator 61, 72, 83 and 93 may be cycled through a range of values in discrete increments as controlled by the controller 41 to determine the attenuation setting to operate the optical sensor device.

It should also be appreciated that any of the described variable attenuators may be provided to page position sensor 12, color alignment sensor 13, or encoder sensor 22. Moreover, any of sensors 30, 60, 70, 80, or 90 may serve as sensor 42 in FIG. 4 having attenuators 50, 61, 72, 83 and 93, respectively.

While this invention has been described in conjunction with exemplary embodiments outlined above, many alternatives, modifications and variations will be apparent to those skilled in the art. For example, the various features of FIGS. 3–10 may be used in combination for multiple compensations of an optical sensor. All embodiments may also incorporate an alert indication to notify of a fault with the optical sensor. Accordingly, the exemplary embodiments of the invention, as set forth above, are intended to be illustrative, not limiting. Various changes can be made without departing from the spirit and scope of the invention.

What is claimed is:

1. An inkjet printer having an optical sensor device with sensor compensation, the device comprising:

an optical emitter emitting an optical signal of an optical signal level according to an emitter input from an electric source;

an optical detector disposed to detect the optical signal and output a detector output having an output metric according to the detected optical signal, the output metric being a voltage level, a voltage drop, or a detection trigger level;

a variable attenuator having an adjustable attenuation setting to provide a variable sensitivity to the optical sensor device; and a controller adjusting the attenuation setting of the variable attenuator during an adjustment operation to adjustably vary the variable sensitivity of the optical sensor device, determining the attenuation setting at which the output metric of the detector output exceeds a predetermined value, and accordingly setting the variable attenuator at an attenuation setting to operate the detector output with the output metric better than the predetermined value by a margin.

2. The inkjet printer having the optical sensor device according to claim 1, wherein the electric source is a voltage source.

3. The inkjet printer having the optical sensor device according to claim 1, wherein the electric source is a switched signal.

4. The inkjet printer having the optical sensor device according to claim 1, wherein the electric source is a pulse-width modulated signal, the variable attenuator includes a pulse-width modulated signal driver and the attenuation setting is a setting of the duty cycle of the pulse-width modulated signal.

5. The inkjet printer having the optical sensor device according to claim 1, wherein the variable attenuator is a pull-up resistor electrically connected between an electric source and the optical emitter to provide the emitter input, the pull-up resistor being a ladder-network resistor adjustable through a range of resistance values by step increments to vary the optical signal level.

6. The inkjet printer having the optical sensor device according to claim 1, wherein the optical detector includes an emitter lead and a collector lead, and the variable attenuator is a pull-up resistor connected between a voltage source and the collector lead, forming a variable common-emitter amplifier.

7. The inkjet printer having the optical sensor device according to claim 1, wherein the optical detector includes an emitter lead and a collector lead, and the variable attenuator is a ladder-network resistor connected between a ground and the emitter lead, forming a variable common-collector amplifier.

8. The inkjet printer having the optical sensor device according to claim 1, wherein the optical detector includes a base lead, an emitter lead and a collector lead, and the variable attenuator is a ladder-network resistor connected between the base lead and the emitter lead, forming a variable base connection.

9. The inkjet printer having the optical sensor device according to claim 1, wherein the optical sensor device is a page position sensor and the adjustment operation is a part of page position sensing operation.

10. The inkjet printer having the optical sensor device according to claim 1, wherein the optical sensor device is a color alignment sensor and the adjustment operation is a part of color alignment operation.

11. The inkjet printer having the optical sensor device according to claim 1, wherein the optical sensor device is for sensing an encoder and the adjustment operation is based on sensing the encoder.

12. The inkjet printer having the optical sensor device according to claim 1, wherein the controller is further capable of identifying an alert condition when the sensor compensation is insufficient to achieve desired sensor performance.

13. A method for compensating an optical sensor due to contamination or sensed color, used by xerographic reproduction apparatus and used to compensate for printing contamination on the optical sensor, the optical sensor comprising an optical emitter, an optical detector, a variable attenuator having an adjustable attenuation setting, and a controller adjusting the attenuation setting, the method comprising:

operating the optical sensor by positioning and activating the optical sensor over a medium, the optical emitter being disposed to emit an optical signal towards the medium, and the optical detector being disposed to detect the optical signal from the medium and output a detector output having an output metric according to the detected optical signal, the output metric being a voltage level, a voltage drop, or a detection trigger level;

adjusting the attenuation setting of the variable attenuator through a range of attenuation values by discrete step values to vary the output metric of the detector output;

comparing the varying output metric of the detector output with a predetermined value, and determining the attenuation setting at which the output metric of the detector output exceeds the predetermined value; and setting the attenuation of the variable attenuator to reset the output metric of the detector output at a level exceeding the predetermined value by a margin.

14. The method according to claim 13, further comprising the step of setting a fault indication to indicate that the sensor compensation is insufficient to achieve the predetermined value.

15. The method according to claim 13, wherein the variable attenuator includes a pulse-width modulated signal driver and the attenuation setting is a duty cycle setting of the pulse-width modulated signal driver.

16. The method according to claim 13, wherein the optical sensor is a page position sensor, the adjustment operation is a part of page position sensing operation, and the medium is a recording medium.

17. The method according to claim 13, wherein the optical sensor is a color alignment sensor, the adjustment operation is a part of color alignment operation, and the medium is a recording medium.

18. The method according to claim 13, wherein the optical sensor is for sensing an encoder, the adjustment operation is based on sensing the encoder, and the medium is either a linear strip or rotary disc encoder.

* * * * *